United States Patent
Bauer

[15] 3,673,727
[45] July 4, 1972

[54] FISHING LURE OR ATTRACTOR

[72] Inventor: Eddie Bauer, Bellevue, Wash.

[73] Assignee: Simco, a co-partnership consisting of Eddie Bauer and Eddie C. Bauer, Bellevue, Wash.

[22] Filed: Sept. 2, 1970

[21] Appl. No.: 68,821

[52] U.S. Cl. ........................................................... 43/42.51
[51] Int. Cl. ......................................................... A01k 85/04
[58] Field of Search ................................... 430/42.5, 42.51

[56] References Cited

UNITED STATES PATENTS

| | | | |
|---|---|---|---|
| 2,637,134 | 5/1953 | Davidson | 43/42.5 X |
| 1,317,890 | 10/1919 | Patton | 43/42.51 |
| 3,056,228 | 10/1962 | Stackhouse | 43/42.51 |

FOREIGN PATENTS OR APPLICATIONS

| 510,092 | 2/1955 | Canada | 43/42.5 |
|---|---|---|---|

Primary Examiner—Melvin D. Rein
Attorney—Ford E. Smith

[57] ABSTRACT

A novel trolling lure is disclosed which comprises an elongated plate or blade having an intermediate portion between an obtusely canted flat front portion and an obtusely but oppositely canted flat rear portion. The front and rear portions are joined to and cant from the intermediate portion at transverse bends or creases disposed angularly across the plate relative its longitudinal axis, oppositely thereto with respect to each other. The lure is provided with leading and trailing apertures disposed along the axis of the lure for the attachment of trolling lines. The front and rear portions each may have wings at their side edges standing from the obtusely canted faces, the wings at one being directed downwardly and at the other end upwardly with respect to the flat intermediate portion has been inserted. Preferably the wings on each portion are unbalanced as to area and this unbalance is opposite as between said two end portions and the lines along which the wings are bent are directed so as to intersect the lure axis.

4 Claims, 9 Drawing Figures

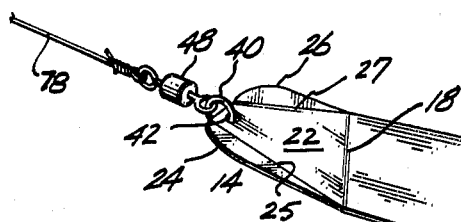
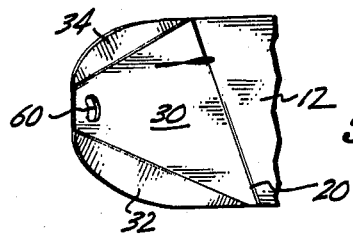
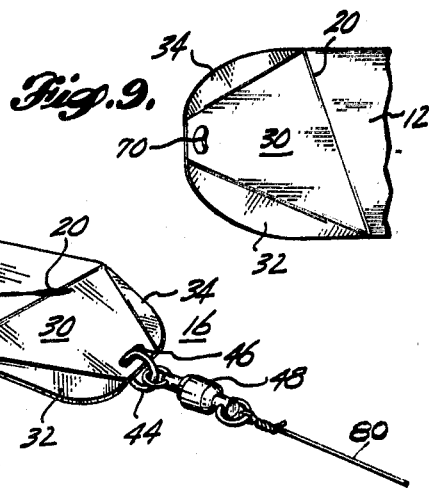
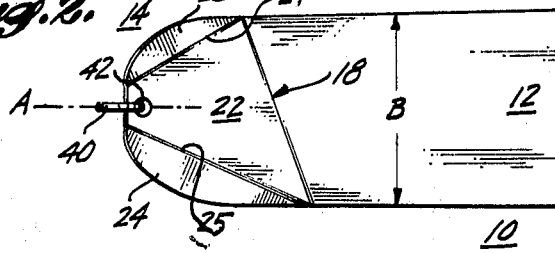
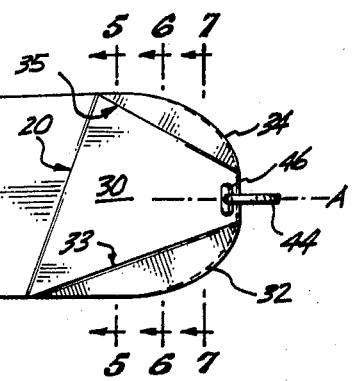
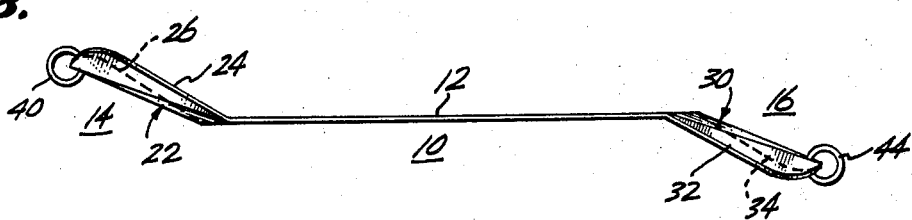
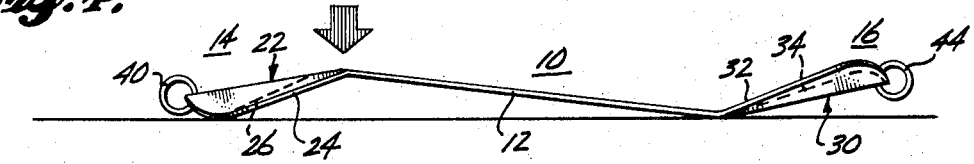
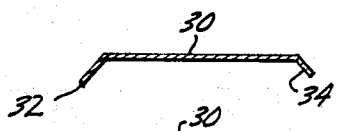
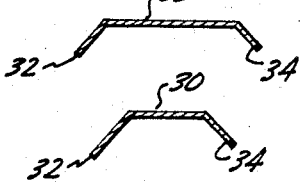
INVENTOR.
EDDIE BAUER
BY Ford E. Smith
ATTORNEY

FISHING LURE OR ATTRACTOR

SUMMARY OF THE INVENTION

The trolling gear art for game and food fish is replete in the use of a wide variety of lures, spoons, flashers, attractors, and the like. In general, most such devices comprise a piece of tempered metal adapted to be coupled into a trolling line; some to spin, some to rotate, some to revolve, and some to dart and dash about in the water, all hopefully to attract fish and cause them to strike and be hooked. One of the common features of prior lures has been that most, if not all, were primarily designed for attracting a single species of fish and were operable only under very limited conditions of speed of troll, water currents, depth of troll, and the like to such extent that any material variation in any one condition precluded the lure from "working" effectively under other and different conditions. Consequently success in fishing was minimal. Another problem with prior art lures has been that primarily the most expert and skilled fishermen with long years of experience are able to make such lures "work". And then only by giving them constant attention, and by conducting numerous experimental settings and by changes in their relation to other associated gear.

It has always been appreciated by skilled fishermen that relatively slight changes in the contours of the lures can have material effects on the working of the lures. An important object of this invention, therefore, has been to provide a positively fixed action in a readily adjustable lure, one whose action may be quickly and effectively varied on the spot by even the novice, from simple understandable instructions provided with each lure.

About the closest prior approach to a practical lure or attractor known to applicant is that shown in Davidson's U.S. Pat. No. 2,637,134. This patentee points to a fault common with his first such lure and with all subsequent lures when he discussed the attractor being straightened out by the pull of the fish. He stated that it then is necessary to reform the attractor by placing it in a die again. In effect, this is to say that the lure has ceased "working" and, therefore, must be reshaped. It is also being said that the attractor must be reworked in a die and is not manually reworkable. One of the primary problems with Davidson is that were manual reworking attempted, the fisherman would not find it possible to know when he had reshaped the lure to its norm, or preferred and operable condition. It is an important object of this invention to provide a reliable fixed, multi-action, reversible lure that has a darting, dodging, revolving but spin-free action, which can be manually adjusted to vary the beat of such action, and which, should it become misshaped, can be accurately and easily returned to its normal or desired shape by anyone — expert or novice.

It has been noted that as among salmon species, the beat of the gear should be varied. For example, while a beat of 50 to 60 actions per minute will very successfully attract King salmon (sometimes called tyee, chinook, spring, or blackmouth), a beat of 70 to 90 actions per minute is more effective on silver salmon (sometimes called coho). An "action" as used here refers to the observable dip or beat of the tip of the rod as trolling is being conducted. The beat of the rod tip is caused by the attractor or lure in the water revolving and darting and rising or diving due to the effect of its movement relative the water. To a very limited extent, this can be controlled by speeding up or slowing down the boat from which the attractor is trolled, but this is possible only in still water. The action of the lure, to be fully effective, must be controlled by its basic capability and preferably by being adjustable even by a novice on the water while fishing is going on.

DESCRIPTION OF THE DRAWINGS

FIG. 1 is a perspective view of an attractor;
FIG. 2 is a plan view of the attractor;
FIG. 3 is a view of the near edge of the attractor of FIG. 1;
FIG. 4 is a view of the far edge of the attractor of FIG. 1;

FIGS. 5, 6, and 7 are cross sections in the planes 5—5, 6—6, and 7—7 respectively of FIG. 2; and FIGS. 8 and 9 are views of end fragments of a lure showing alternative hook or line attaching means.

DESCRIPTION OF THE INVENTION

The attractor 10 shown in FIG. 1 essentially comprises three main elements; the long flat intermediate portion 12, a flat first end portion 14, and a flat second end portion 16. First portion 14 is canted obtusely with respect to one face of intermediate portion 12. Second portion 16 is also canted, but obtusely with respect to the other face of intermediate portion 12 and oppositely disposed with regard to said first portion 14.

First portion 14 is joined to intermediate portion 12 by transverse bend or crease 18 which is disposed obliquely across the attractor 10 with respect to its longitudinal axis A—A as shown in FIG. 2. Similarly, second portion 16 is joined to intermediate portion 14 by transverse bend or crease 20, likewise obliquely disposed across attractor 10 with respect to the longitudinal axis A—A.

Bends or creases 18 and 20 thus angularly cross axis A—A in non-parallel, opposite relation to each other as shown in FIGS. 1 and 2.

First portion 14 comprises the somewhat triangular, flat nose 22 having wings 24,26 at its edges. The wings are struck from the metal forming the sides of the first portion by creases 25 and 27 respectively which extend in converging manner from the sides of intermediate portion 12 starting at the ends of crease 18. Because of the oblique disposition of crease 18, the length of crease 25 is greater than crease 27. As a result, wing 24 has greater area than wing 26 and, therefore, functions in an imbalanced manner when drawn through the water.

It should be noted that the larger wings 24 and 32 are on the same side of attractor 10 and that the smaller wings 26 and 34 are also on the same side of the attractor and are opposite the larger wings.

The manner in which the end portion 14 is formed, by creases or bends 18, 25, and 27 defining the flat generally triangular first portion 14 having wings or fins 24,26 on the edges thereof, results in that end portion being stiff and rugged, and quite unchangeable or damage proof under ordinary conditions of handling in and out of the tackle box, in and out of the water, and during fishing. The same stiff and rugged characteristics prevail with respect to second portion 16 with its creases 20, 33, and 35, and wings or fins 32,34. About the only change that external force can bring about in the lure is change in the obtuse angles prevailing at creases 18 and 20, i.e., the angular relation of end 22 to blade 12 and of end 30 to blade 12. These angles may be intentionally changed by the fisherman as suggested in FIG. 4. By placing the lure on a firm flat surface and applying pressure, as suggested by the arrow illustrated, the angle may be opened or increased. Conversely, by placing blade portion 12 on a firm flat surface with an end portion, front or rear, overhanging the surface edge in a downward direction, pressure applied to the upper surface of the overhanging end will tend to close the angle at crease 18 or 20 as the case may be. By using a simple gauge or template usually provided with each lure, the fisherman may quickly and easily and accurately adjust these obtuse angles and knowingly vary the fishing action of the lure.

It may be that during handling and use of the lure or during polishing, storage, or because of mishandling, the intermediate section 12 may become bowed or warped. Its desired form is planar, i.e., flat from end-to-end and crossways. Manual manipulation of mid-section 12 to straighten merely requires sighting along an edge as the blade is manually worked since the eye can detect variations as small as two or three thousandths of an inch.

One of the reasons for manually adjusting the lure as described comes about as a direct result of the vagaries of manufacture. A blanking die can be provided whereby the overall size and shape of the lure blanks will always be the same throughout a manufacturing run. And a forming die can be provided that will always crease the lure blanks the same. Thereafter, the shaped lures are cleaned and polished by buffing to make them extremely bright or to prepare them for plating. Polishing and buffing heats the lure and causes inherent surface stresses to be relieved. As a result, all lures will become warped and non-uniform as to shape whereever there are unsupported, gradual bends or flat surfaces. By reason of this described design, workmen as well as fishermen can readily and accurately shape or reshape one flat unsupported surface of the lure to its preferred relationships of the nose and trailing fixed portions to the mid-portion.

The action of this lure in use in the water is characterized by the head end travelling widely as it tolls over, darts, zig zags, and changes pace while the trailing end follows with less wide action quite duplicative of a natural fluttering, life-like swimming nature and quite similar to that of live, feeding fish.

For attaching the lure an as attractor into trolling gear, a front ring 40 is provided in aperture 42 and a rear ring 44 in aperture 46 here shown as laterally elongated. Each ring is connected to a swivel 48, in this case a ball-bearing swivel to insure the most free and frictionless rotation. Apertures 42 and 46 are preferably located on the axis A—A.

It is usually desireable although it may be fished in reverse to have the front end of the attractor 10 narrower than the trailing end as shown by distance B in FIG. 2 being less than distance C. For example in a 6 inch attractor useful as a trolling spoon, distance B may be about 1/16 of an inch less than distance C. In a 12 inch attractor useful as a flasher or dodger, distance B may be about 3/16 of an inch less than distance C. Conversely, the relative narrowness may be arranged at the trailing end of the lure and the broader portion in the leading position.

As seen in FIG. 2, crease 18 is nearer the leading end of attractor 10 than is crease 20 with respect to the trailing end. By this one example the total area of the nose portion 22 is lesser by more than by width alone than the total area of the trailing or rear portion 30. Various fish prefer various actions. These may be provided by varying lengths, areas, etc. of the lures at the time of manufacture. It is to be understood that the showing in FIG. 1 is exemplary of an arrangement of the lure 10 in fishing gear where the forward direction is to the left with first portion 14 leading and second portion 16 trailing. The lure is however reversible and may be trolled as the right in FIG. 1 in which case portion 16 leads and portion 14 trails. Alternatively, the creases 18 and 20, or either of them, may be located closer to or farther from the ends of lure 10 to provide variations in action. It is possible by reason of such variations in the relative proportions of parts 12, 14, and 16 to provide a lure which, when trolled in one direction, will revolve at, say, 60 r.p.m.'s and yet, when trolled in the opposite direction under the same currents and the like, will revolve at, say, 90 r.p.m.'s.

Lures tend to revolve in a cylindrically spiral path as they are trolled through the water. The lure 10 of FIG. 1 is arranged to revolve in a clockwise manner. By arranging that creases 18,20 cross the axis oppositely to the arrangement shown, the lure 10 will revolve in a counter-clockwise manner. Thus, with a troller having two lines out, on opposite sides of the boat, it is possible to have parallel non-similar attracting actions at the same time. This becomes important in waters of shifting directions and in commercial fishing where there may be as many as three lures on leader lines at different depths trolling from a single, heavily weighted main line.

In FIGS. 8 and 9, the transversely elongated rear apertures 60 and 70 are shown respectively as rearwardly concave and rearwardly convex, i.e., crescent shaped. In trolling, a lure having a straight elongated rear aperture 46 and leader 80 is attached by a ring 44 to the attractor, there will be darting movements of the bait at the rear of leader 80. These movements cause ring 44 to slide or slip in the opening 46, or 60, or 80 to one end or the other. This not only distributes wear of the ring and lengthens life of the lure, but it applies an unbalancing force on the attractor body 10 and produces constant erratic actions therein that are very effective in catching fish, especially in cross currents and tide rips when fishing particularly for salmon is at its best. The rearwardly concave shape of crescent aperture 60 tends to hold the ring toward one or the other end until that hold is overcome whereupon force is somewhat suddenly and abruptly released. The attractor action similarly effected with the rearwardly convex shape of crescent aperture 70 on ring 44 tends to center the ring in the aperture and allows it to move transversely thereof less abruptly, but nevertheless with unbalancing action on the attractor 10.

As an example of a practical working lure according to this invention, the following dimensions prevailed (referring to FIG. 2):

| | |
|---|---|
| overall length of blank | 12" |
| final length of shaped lure | 11 11/16" |
| width at "B" | 2½" |
| width at "C" | 2 11/16" |
| length of crease 18 | 2¾" |
| length of crease 20 | 3" |
| length of crease 25 | 2½" |
| length of crease 27 | 1⅜" |
| length of crease 33 | 3" |
| length of crease 35 | 1 7/8" |
| obtuse pitch angle at crease 18 | 169° |
| obtuse pitch angle at crease 20 | 165° |
| metal used | tempered spring brass |
| metal thickness | 20 guage |

Such an attractor is operatively used for salmon fishing in a trolling line 78, with swivel connections 48 at each end, in advance of a similar smaller spoon. Or by means of leader 80, it may precede a herring (whole or cut) attached by a herring hook-up, or it may be used in advance of a fly, plastic gimmick, or plug lure. While it is the general experience of salmon fishermen that only King and Silver salmon take to metal lures and attractors, it has been my experience that salmon ordinarily only taken by net will also be lured to strike at attractors according to this invention. These include dog salmon, sockeye, and humpies.

A smaller size lure, similarly formed and shaped of say 2 to 6 inches in length, may be fished with or without the larger attractor in advance of it. Without an attractor, such a smaller spoon evidences all the same action and is effective as a lure for smaller salmon and other sea fishes, and in fresh water for many varieties of fish, and particularly trout. The smaller lures shaped as described have proved to be excellent for lake and stream fishing.

A word about adjustability will disclose advantages and benefits of this lure invention not readily to be understood, it is believed, to those skilled in the art. Commercial fishermen trolling lures commonly troll three main deep lines at each side of the boat and each deep line trolls three luring lines. Such an arrangement involves an array of 18 lures or attractors placed at numerous depths involving different water conditions as to tides, currents, flow directions, and the like. Because there are varying actions obtained among a given number of spoons or attractors, even though all manufactured by the same dies and techniques, the commercial fisherman must either work the spoons of a set to try to make them function with similar success or he must select similarly effective spoons from many sets to make up a "hot" set. The latter is obviously time consuming and costly, and the reworking is almost impractical for reasons given above. With a number of spoons or lures according to this invention, the commercial fisherman may quickly adjust the action of the article manually for surface, mid-depth or deep trolling and thus produce a hot and effective set. This feature is obviously of great benefit to the commercial fisherman who, after all, cannot simply indulge in costly, time consuming but ineffective trolling where landings are few and far between.

In the foregoing description has been set forth a preferred form of fish attractor. It will readily occur to those skilled in the pertinent art that proportions between parts, overall sizes, and similar alterations and modifications may be desireable. All such as, under an appropriately liberal application of the doctrine of equivalents, fall within the spirit and scope of the subjoined claims are intended to be covered by this patent.

What is claimed is:

1. A trolling lure, comprising
an elongated plate including
 a long flat intermediate portion;
 a flat front portion canted obtusely with respect to one face of said intermediate portion; and
 a flat rear portion canted obtusely with respect to the other face of said intermediate portion and oppositely disposed with regard to said front portion;
said front and rear portions each being joined to said intermediate portion at a transverse straight-line bend disposed angularly across said intermediate portion relative the longitudinal axis thereof, said bends being oppositely related to each other with respect to said longitudinal axis;
said front and rear portions having leading and trailing apertures on the longitudinal axis of the lure for attachment of said lure into trolling equipment;
said flat front portion and said flat rear portion each having wings at its side edges standing obtusely from the face thereof; and
the wings at one end of the lure being directed upwardly with respect to the flat intermediate portion, and at the other end downwardly with respect to the said flat intermediate portion, the lines along which the front wings are bent intersecting the longitudinal axis of the lure slightly in advance of the leading aperture of the lure and the lines along which the rear wings are bent intersecting the longitudinal axis of the lure slightly to the rear of the trailing aperture.

2. A lure in accordance with claim 1 in which the intermediate portion is tapered from one end toward the other end.

3. A lure in accordance with claim 1 in which the transverse bend forming one of said canted portions is nearer the end of said elongated plate than is the transverse bend forming the other of said canted portions.

4. A lure in accordance with claim 1 in which the transverse bends across said plate are disposed at different obliquely positioned angles relative the longitudinal axis of said plate.

* * * * *

UNITED STATES PATENT OFFICE
CERTIFICATE OF CORRECTION

Patent No. 3,673,727          Dated 7 July 1972

Inventor(s) EDDIE BAUER

It is certified that error appears in the above-identified patent and that said Letters Patent are hereby corrected as shown below:

Item [73] on the title page of said patent is changed to read:

[73] Assignee: B & B, a co-partnership comprising Eddie Bauer and Eddie C. Bauer, Bellevue, Washington Signed and sealed this 24th day of October 1972.

(SEAL)
Attest:

EDWARD M. FLETCHER, JR.
Attesting Officer

ROBERT GOTTSCHALK
Commissioner of Patents